United States Patent [19]

Volpe

[11] Patent Number: 5,412,715

[45] Date of Patent: May 2, 1995

[54] APPARATUS AND METHOD FOR CONNECTING TELEPHONE SWITCHING DEVICES

[75] Inventor: Kevin Volpe, E. Haven, Conn.

[73] Assignee: Executone Information Systems, Inc., Milford, Conn.

[21] Appl. No.: 63,861

[22] Filed: May 19, 1993

[51] Int. Cl.⁶ .................. H04M 1/00; H01R 4/24
[52] U.S. Cl. .................... 377/326; 379/328; 439/402
[58] Field of Search .................. 379/325–332, 379/399, 441, 442, 21, 22; 439/402, 404, 532, 719

[56] References Cited

U.S. PATENT DOCUMENTS

| Re. 31,714 | 10/1984 | Knickerbocker | 439/402 |
|---|---|---|---|
| 3,836,942 | 9/1974 | Knickerbocker | 439/402 |
| 4,160,880 | 7/1979 | Brey | 379/328 |
| 4,321,588 | 3/1982 | Gabor et al. | 340/381 |
| 4,752,107 | 6/1988 | Gunell et al. | 379/326 X |
| 4,799,251 | 1/1989 | Smith et al. | 379/21 X |
| 4,808,116 | 2/1989 | Unger et al. | 439/719 |
| 4,887,289 | 12/1989 | Montegari et al. | 379/22 |
| 4,996,695 | 2/1991 | Dack et al. | 379/21 X |
| 5,136,589 | 8/1992 | Konishi | 370/16.1 X |
| 5,190,460 | 3/1993 | Emani | 439/719 |

Primary Examiner—James L. Dwyer
Assistant Examiner—Daniel S. Hunter
Attorney, Agent, or Firm—Dilworth & Barrese

[57] ABSTRACT

An improved terminal connecting block and bracket assembly is disclosed. The terminal connecting block contains four sets of flat elongate electrically conductive elements. Each of the third set and each of the fourth set of elements is electrically isolated from the other sets of elements, and a unitary connector connects the sets of elements to auxiliary devices and central office equipment. Removable bridge connectors provide different interconnections without rewiring. The terminal connecting block is used with a bracket for mounting the block on a surface.

20 Claims, 9 Drawing Sheets

APPARATUS AND METHOD FOR CONNECTING TELEPHONE SWITCHING DEVICES

BACKGROUND OF THE INVENTION

1. Field of the Invention

This invention relates to a pre-wired terminal connecting block suitable for forming interconnections among a large number of electrically conductive wires. More particularly, this invention relates to a pre-wired terminal connecting block and bracket assembly for coupling and interconnecting central office equipment and auxiliary equipment using a reduced number of required cross connections.

2. Description of the Prior Art

Telephone networks and network devices, such as, for example, private branch exchanges (PBXs), require numerous cross connections to establish the necessary communication links and pathways between telephone users and devices. Applications requiring communication pathways may range from links between a multitude of individual telephones and devices to equipment allowing conference calls, intercoms, and other telephone services throughout, for example, a single office in a building. The large number of cross connections linking various communication devices are often established using terminal connecting blocks supporting rows of conductive elements for creating junctions between devices by cables and wires.

However, cross connections of wires and cables at the terminal blocks often must be established manually after installation of the terminal connecting block in a building and after installation of each device. Furthermore, the terminal connecting block should allow for modification of established cross connections between devices as each device is added, removed, or replaced.

It would be advantageous to reduce the number of cross connections between devices through the terminal connecting block, and to allow modifications in the cross connections to be readily made.

Reissued U.S. Pat. No. Re. 31,714, reissued Oct. 30, 1984, illustrates a pre-wired terminal connecting block providing a reduction in the number of cross connections required. Reissued U.S. Pat. No. Re. 31,714 is herein incorporated by reference.

Reissued U.S. Pat. No. Re 31,714 discloses conductive elements having pairs of opposing contact fingers joined at a base portion having a tang, resulting in each pair having conductive elements possessing three contact points, i.e., the two contact fingers and the tang. Devices are coupled through the conductive elements by connecting the devices, directly or by wires, to the contact fingers or tang. Unless all three of the contact points are utilized, the prior art conductive elements will have an extraneous contact point not in use, but the extraneous contact point may not be removed and may not be used independently for other devices.

An improvement in the prior art would be to reduce the number of extraneous contact points by employing individual opposing contact points having a tang, and by using the contact points of coupled devices and unitary connectors as conductive elements for cross connections.

The number of cross connections required may be further reduced by electrically isolating various conductive elements from other conductive elements, and further by utilizing various unitary connectors to electrically couple the isolated conductive elements to the other conductive elements.

SUMMARY OF THE INVENTION

An object of the invention is to provide a pre-wired terminal block with standard unitary electrical connectors that can mate with a unitary electrical connector on the block so that PBXs and auxiliary equipment or devices may be installed and coupled, through the unitary connectors, to the terminal connecting block. An additional object of this invention is to reduce the number of cross connections required by electrically isolating various conductive elements. It is still further an object of this invention to utilize various unitary connectors to electrically couple isolated conductive elements to other conductive elements, thereby employing the unitary connectors as cross connections.

These and other objects are attained by the practice of this invention which comprises providing a terminal connecting block containing a plurality of flat elongate electrically conductive elements. Each conductive element in the block comprises a flat base portion and at least one pair of opposing insulating crushing or shearing contact fingers projecting from the base portion and integral therewith. The opposing contact fingers project upwardly from the terminal block. Each electrically conductive element also contains a tang projecting from the opposite end of the base portion. A first plurality of conductive elements is coupled to a second plurality of conductive elements by either conductive wires or by a common conductive junction. A third plurality of conductive elements is electrically isolated from the first and second pluralities of conductive elements. The third plurality of conductive elements is coupled to the second plurality of conductive elements by removable bridge connectors. A fourth plurality of conductive elements is electrically isolated from the first, second, and third pluralities of conductive elements, and at least one PBX is coupled to the fourth plurality of conductive elements.

At least one unitary connector electrically couples the fourth plurality of conductive elements to the third plurality of conductive elements, and optional auxiliary devices, coupled to the unitary connectors, electrically couple the third plurality of conductive elements, through the auxiliary devices, to the fourth plurality of conductive elements.

The third and fourth pluralities of conductive elements are electrically coupled to the unitary connectors by electrically conductive wires. One end of each wire is attached to one of said tangs of the third and fourth pluralities of conductive elements, and the other end of each wire is attached to the unitary electrical connector.

The terminal connecting block is preferably used in combination with a bracket for mounting the block on a surface. The bracket comprises two spaced apart elongate side portions and an elongate rear portion coextensive with the side portions. Each of the side portions is secured to opposite edges of the rear portion and is perpendicular thereto. The front portion of the bracket is open. In addition to many other specific details, the bracket has a plurality of elongated recesses in the side portions for receiving and mounting a plurality of unitary electrical connectors for pre-wiring.

BRIEF DESCRIPTION OF THE DRAWINGS

This invention will be more particularly described with reference to the accompanying/drawings wherein.

DESCRIPTION OF THE PREFERRED EMBODIMENTS

Figure 2A:
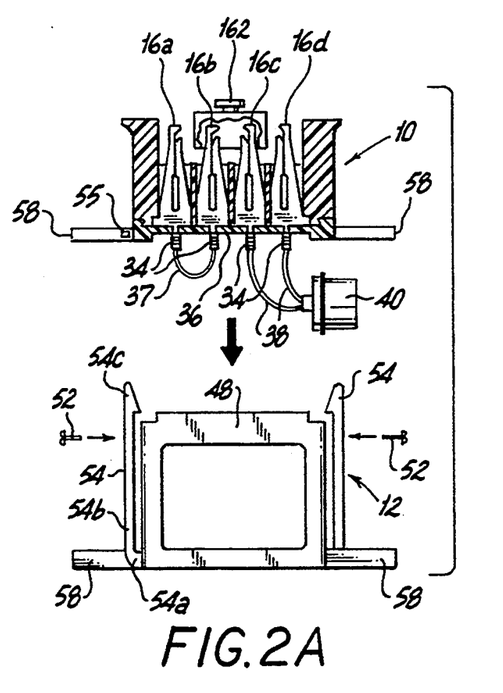
FIG. 2A is an exploded end view of the pre-wired terminal connecting block and bracket assembly.

Referring more particularly to the drawings, there is shown for example in FIG. 2A a terminal connecting block designated generally as 10 and a bracket generally as 12. Both the block 10 and the bracket 12 may be formed of a suitable dielectric and self-extinguishing material, such as a phenol-formaldehyde resin or a polyvinyl resin.

Figure 3:
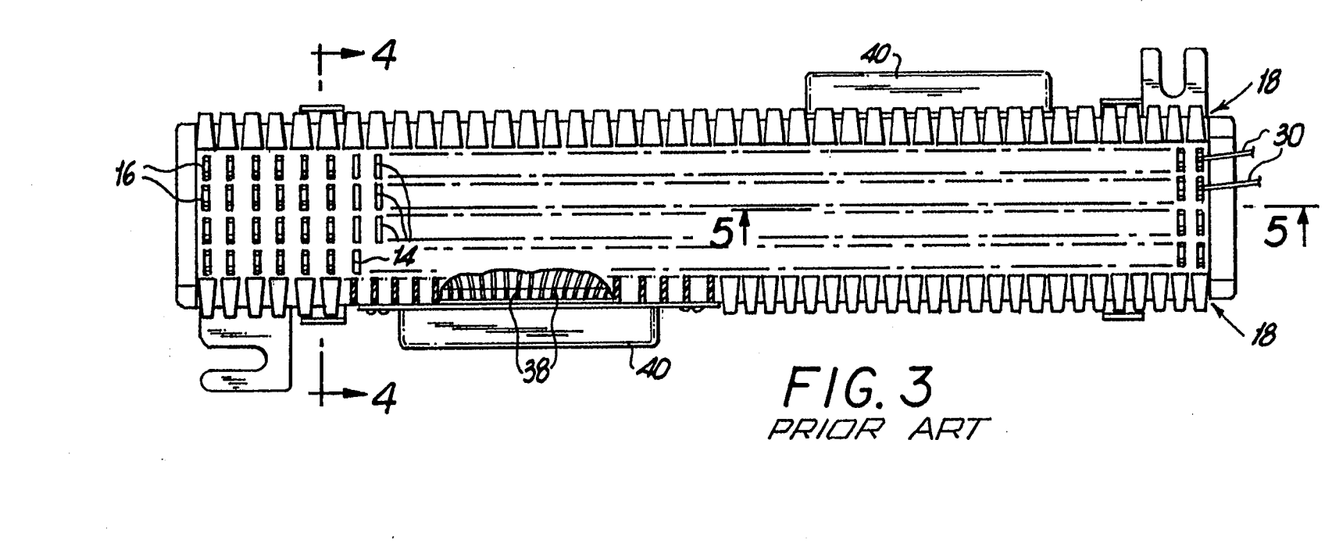
FIG. 3 is a top elevational view, partly in section, of the terminal connecting block and bracket assembly.

As best seen in FIG. 3, the block contains a number of slots 14 which are adapted to receive a set of electrically conductive elements 16. The elements 16 may be constructed of any suitable resilient conductive material, such as phosphorbronze beryllium-copper or other known metal alloy. The block contains a fanning strip 18 on each side thereof to keep separate the wires coming into or going out from the electrically conductive elements 16.

Referring again to FIG. 3, the set of electrically conductive elements 16 include first, second, third, and fourth pluralities of conductive elements 16, with the first plurality of conductive elements mounted in a first row of slots 14 of the block, the second plurality of conductive elements mounted in a second row of slots 14, etc. The first, second, third, and fourth pluralities of conductive elements 16 are aligned in the slots 14 to form a plurality of columns of four conductive elements, with each column including a respective conductive element of each of the first, second, third, and fourth pluralities of conductive elements.

As best shown in FIGS. 2A–2B and FIGS. 4A–4B, each of electrically conductive elements 16a–16d includes two pairs of opposing contact fingers 20 and 22 joined at one end to a base portion 24. Each pair of opposing contact fingers 20 and 22 forms a pair of mutually opposed edges 26 and 28 which shear or crush the insulation from an electrical conductor 30 (such as from a telephone central office) inserted therebetween. Although the conductive elements have been described as each having two pairs of opposing fingers 20 and 22, it will be understood that each element may have only one pair of opposing fingers 20 and 22 or each may have more than two pairs of fingers depending on the particular requirements of any situation. Beneath the mutually opposed edges 26 and 28 and above the base portion 24 is a slot 32.

Figure 4A:
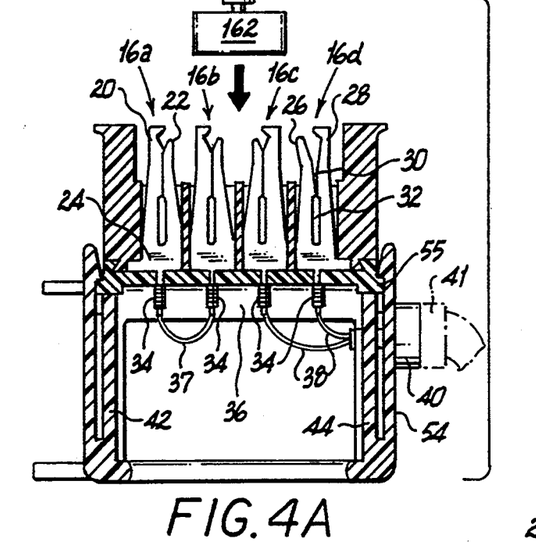
FIG. 4A is a sectional view taken along lines 4—4 of FIG. 3.

As shown, for example, in FIG. 4A, a tang 34 projects from the opposite end of the base portion 24 through holes in the bottom retaining plate 36 of the block 10. Each of the tangs 34 may be connected to one end of an electrically conductive wire 38, such as by means of conventional wire wrapping apparatus. The other end of each electrically conductive wire 38 is attached to a unitary electrical connector 40 or to another tang 34, depending on the coupling of conductive elements. The rest of the wire is covered with insulation.

Figure 12A:
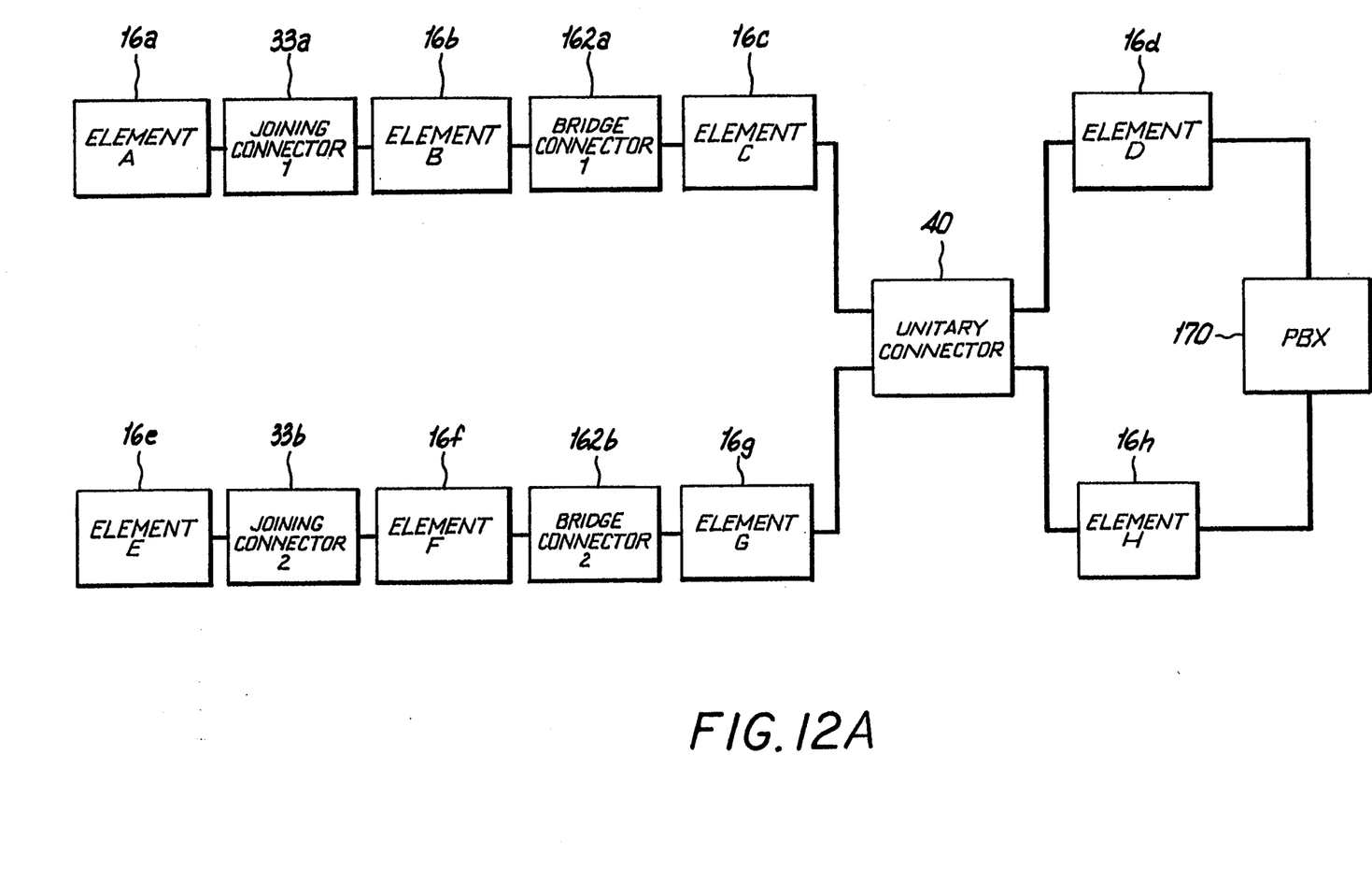
FIGS. 12A–12B illustrate alternate schematics of the present invention.

As shown in the exemplary schematic of FIG. 12A, the present invention includes a first plurality of conductive elements 16a, 16e; a second plurality of conductive elements 16b, 16f; a third plurality of conductive elements 16c, 16g; and a fourth plurality of conductive elements 16d, 16h. Each of the first plurality 16a, 16e is coupled to a respective one of the second plurality 16b, 16f by joining connectors 33a, 33b, respectively. As shown in FIGS. 2A and 4A, each of joining connectors 33a, 33b may be embodied as a conductive wire 37 coupling the tangs of the conductive elements 16a, 16e to the respective tangs of conductive elements 16b, 16f.

Figure 2B:
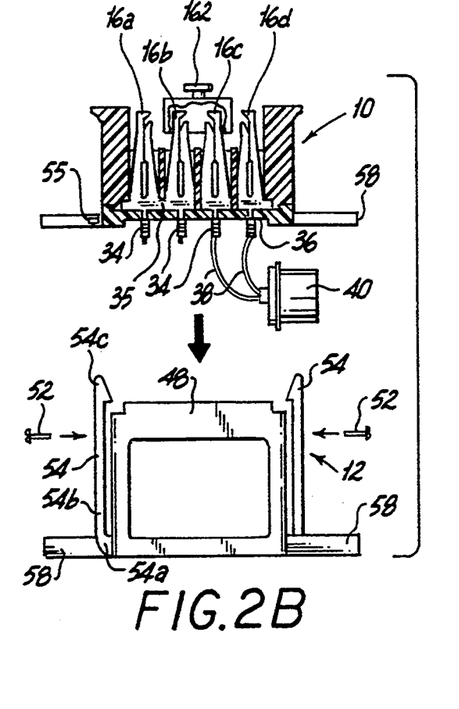
FIG. 2B is an alternate exploded end view of the pre-wired terminal connecting block and bracket assembly.
Figure 4B:
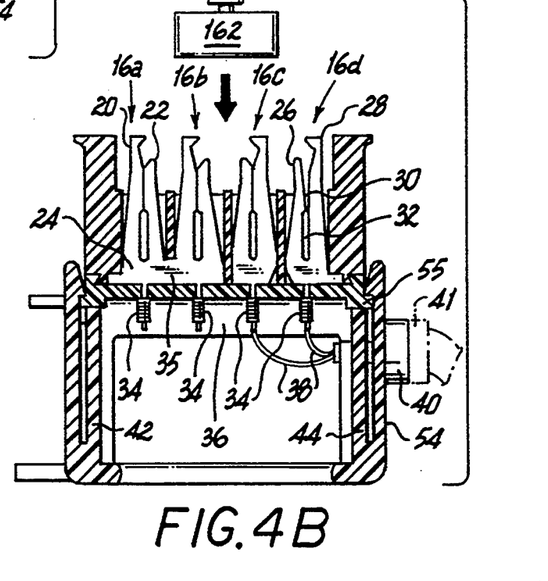
FIG. 4B is an alternate sectional view taken along lines 4—4 of FIG. 3.

Alternatively, as shown in FIGS. 2B and 4B, each of joining connectors 33a and 33b may be embodied as a common conductive junction point 35 of conductive elements 16a, 16b, and conductive elements 16e, 16f, respectively. Thus, conductive elements 16a, 16b may be embodied as an integrated conductive element instead of two separate conductive elements, and similarly, conductive elements 16e, 16f may be embodied as an integrated conductive element instead of two separate conductive elements.

Figure 12B:
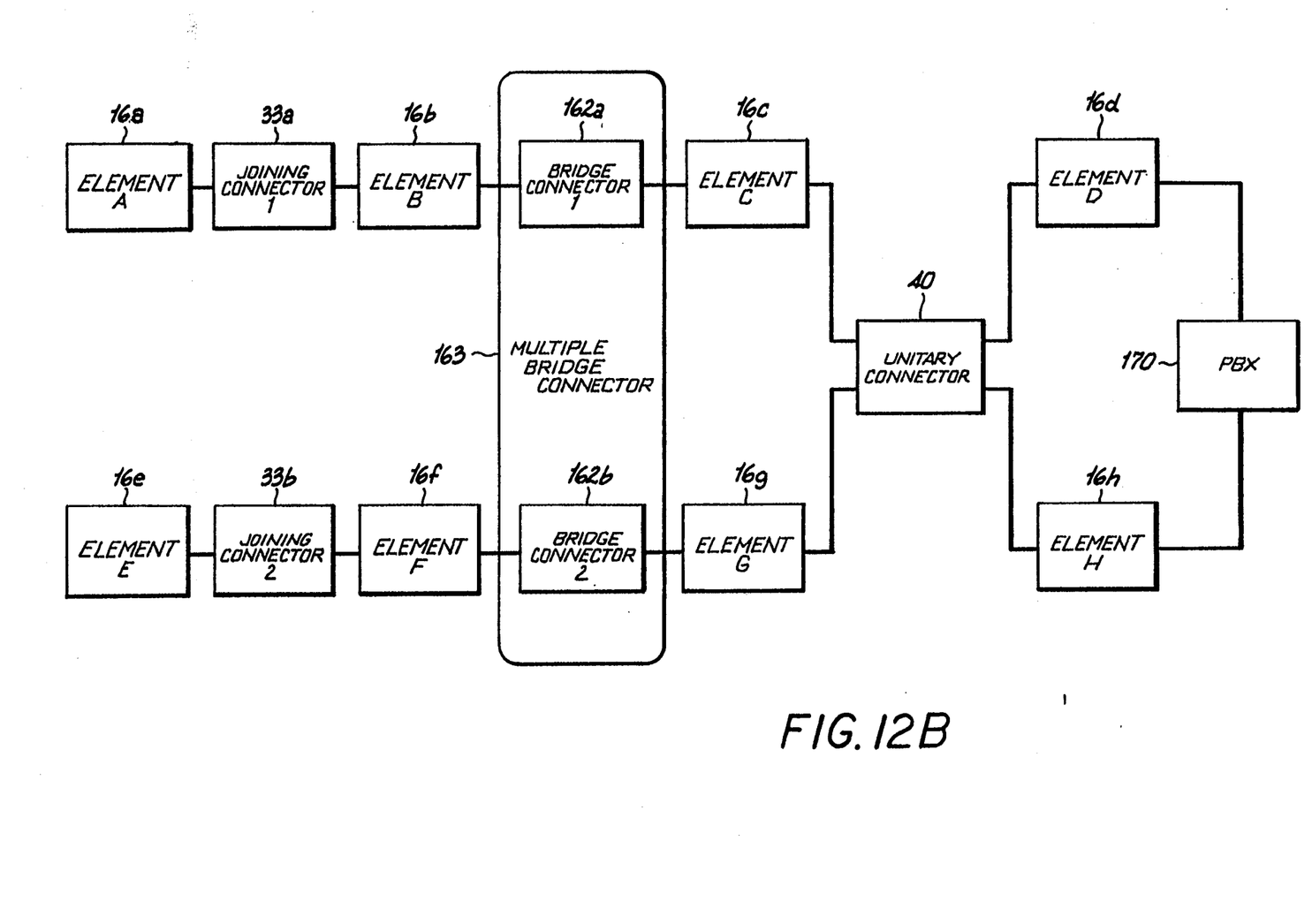
Figure 13:
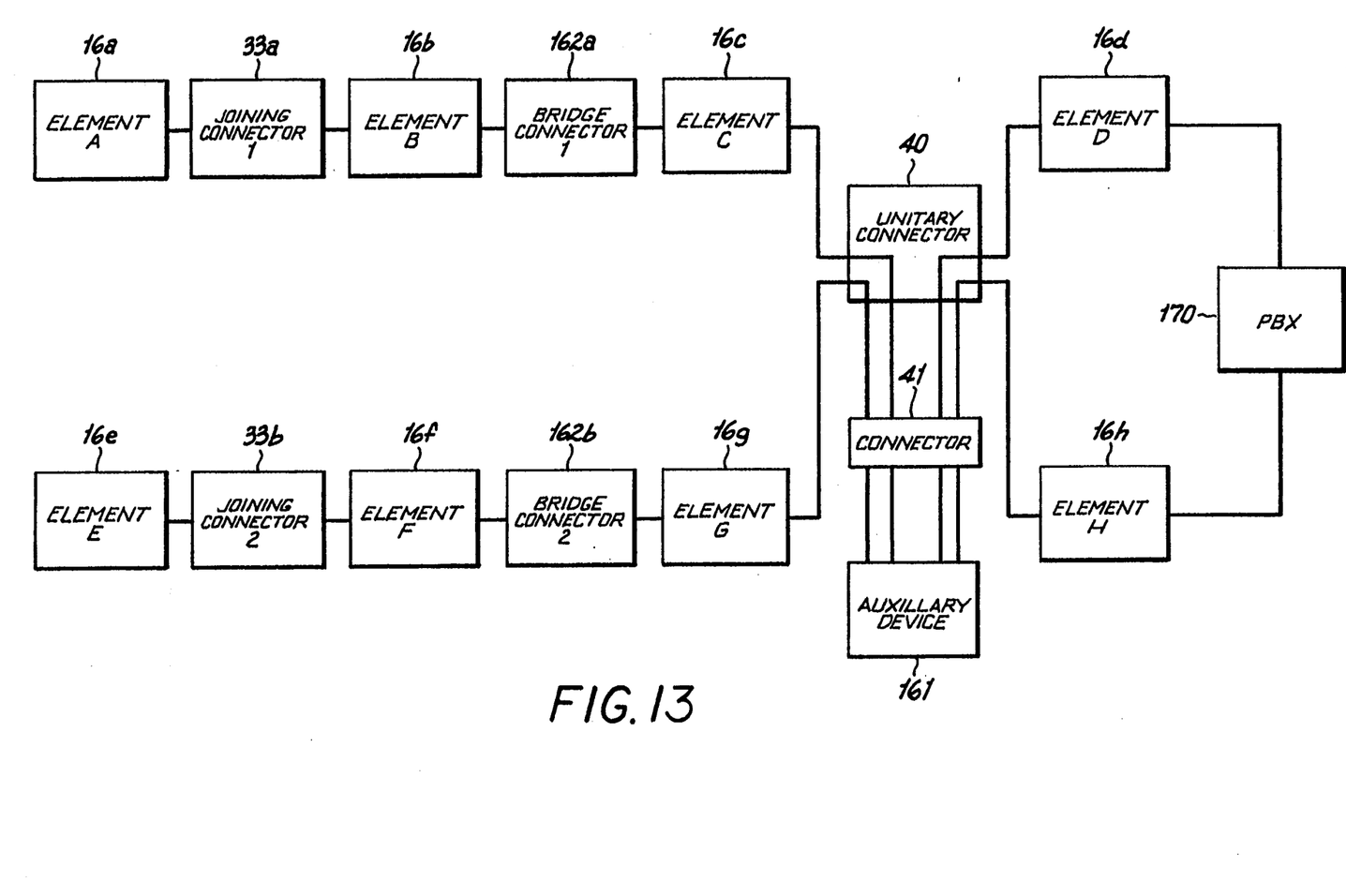
FIG. 13 illustrates an alternate schematic of the present invention, including an auxiliary device.

As shown in FIGS. 12A and 13, the third plurality of conductive elements 16c, 16g are electrically isolated from the first and second pluralities of conductive elements. Each of the second plurality of conductive elements 16b, 16f is coupled to a respective one of the third plurality of conductive elements 16c, 16g by removable bridge connectors 162a, 162b with each of the removable bridge connectors 162a, 162b embodied as bridge connector 162, as shown in FIGS. 2A–2B and FIGS. 4A–4B. Alternatively, as shown in FIG. 12B, at least two removable bridge connectors 162a, 162b may be embodied as a single removable multiple bridge connector 163 for coupling at least two conductive elements 16b, 16f of the second plurality to at least two conductive elements 16c, 16g of the third plurality, respectively.

As shown in FIGS. 12A–12B and FIG. 13, the fourth plurality of conductive elements 16d, 16h is coupled to a PBX 170 or other central office equipment. The fourth plurality of conductive elements 16d, 16h are electrically isolated from the first, second, and third pluralities of conductive elements.

To couple the PBX 170 to the first, second, and third pluralities of conductive elements, the fourth plurality 16d, 16h is coupled to at least one unitary connector 40, as shown in FIGS. 12A–12B and FIG. 13, with the unitary connector in turn being coupled to the third plurality 16c, 16g.

Figure 5:
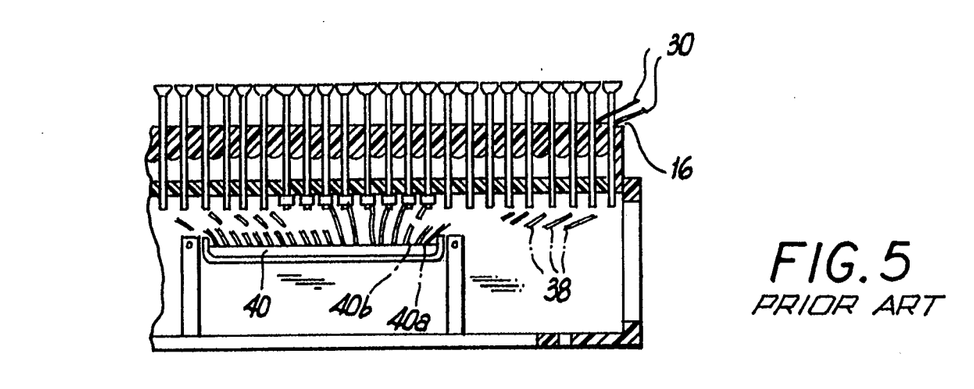
FIG. 5 is a sectional view taken along lines 5—5 of FIG. 3.
Figure 6:
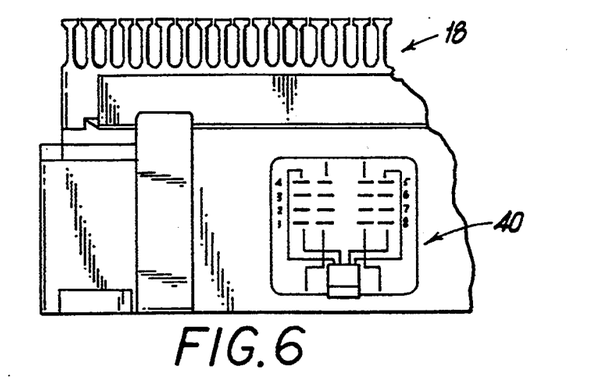
FIG. 6 is a partial side view of the terminal connecting block and bracket assembly, including a unitary connector.

As best shown in FIGS. 5 and 6, the unitary electrical connector 40 contains a plurality of electrical contact points 40a, 40b, 40c, 40d, etc., which may not be in electrical connection with one another. Each electrical contact point 40a, 40b, 40c and 40d, etc., is the termination point of one of the electrical conductive wires 38. Each electrical contact point is adapted to register with a contact point on a connector 41 of an auxiliary device 161, shown in phantom in FIGS. 4A–4B, inserted into the unitary connector 40.

Figure 11A:
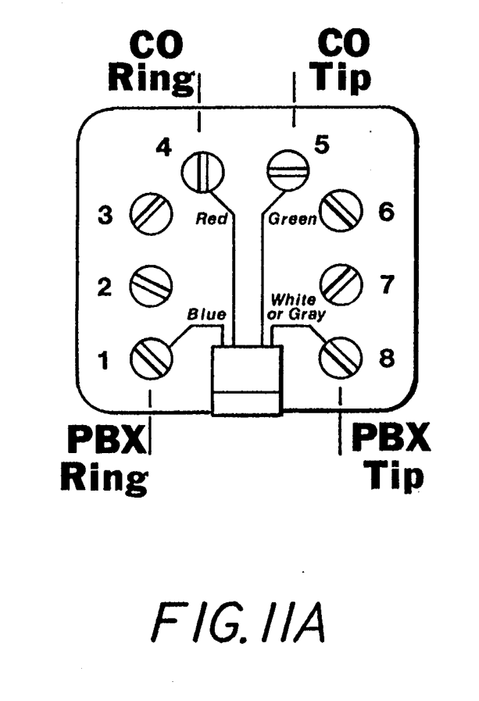
FIGS. 11A–11C show alternate configurations of a RJ-31X jack.
Figure 11B:
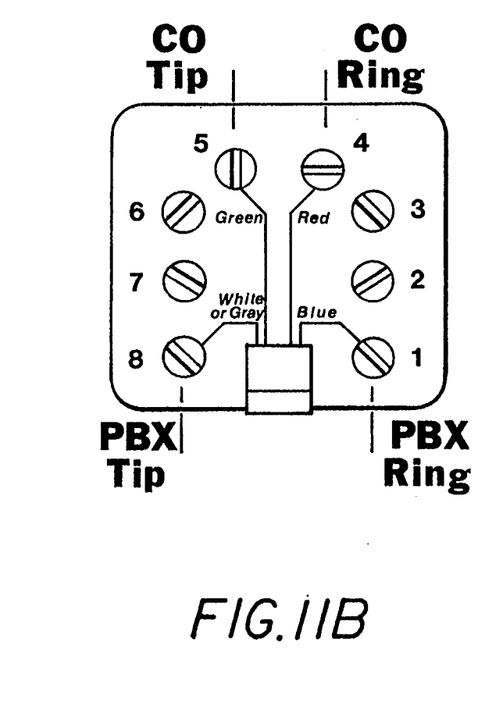
Figure 11C:
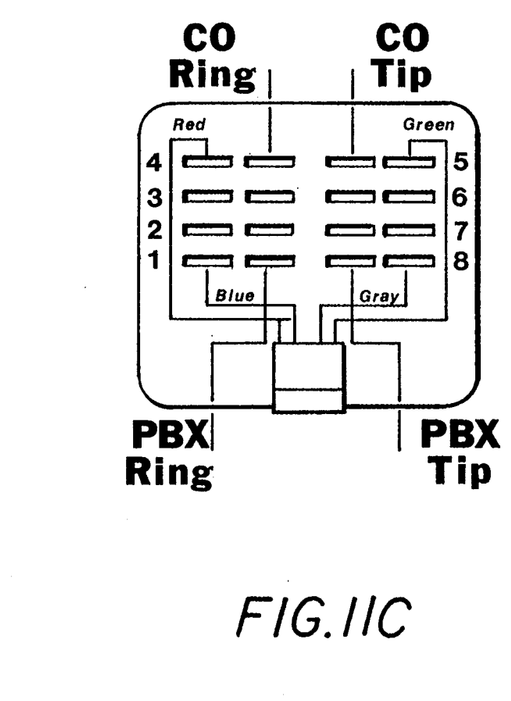

In the preferred embodiment, the unitary connector 40 is embodied as an RJ-31X jack, as illustrated in FIGS. 11A–11C and in FIG. 5. With an RJ-31X jack as the unitary connector 40, the fourth plurality of conductive elements 16d, 16h is electrically coupled to the third plurality of conductive elements 16c, 16g, and therefore, the PBX 170 is coupled to the third plurality 16c, 16g through the RJ-31X jack.

With the third plurality of conductive elements 16c, 16g coupled to the second plurality of conductive elements 16b, 16f either by bridge connectors 162a, 162b, as in FIG. 12A, or by multiple bridge connector 163, as in FIG. 12B, the PBX 170 is electrically coupled to the first, second, and third pluralities of conductive elements, permitting the PBX 170 to be further coupled to other devices by coupling the first, second, and third pluralities to the other devices.

In addition, by having bridge connectors 162a, 162b or multiple bridge connectors 163 removable and readily detachable, the optional removal of the bridge connectors 162a, 162b or multiple bridge connector 163 permits the PBX 170 and other devices coupled to the third and fourth pluralities to be readily disconnected from the devices coupled to the first and second pluralities.

Furthermore, in an alternate embodiment, as shown in FIG. 13, an auxiliary device 161, having a connector 41, is coupled to the unitary connector 40, and the third plurality of conductive elements 16c, 16g is electrically coupled through the auxiliary device 161 to the fourth plurality of conductive elements 16d, 16h. In the preferred embodiment of the invention, the auxiliary device 161 is embodied as a dialer, coupled through the RJ-31X jack, to the PBX 170 and to other devices through the terminal block of the present invention, with a dialer herein defined as a telephone handset or device capable of accessing the telephone system by dialing or inputting telephone numbers, codes, or tones.

As described above, bridge connectors 162a, 162b or multiple bridge connectors 163 may be attached or detached to couple or decouple, respectively, the third plurality of conductive elements from the first and second pluralities of conductive elements. In the above manner, interconnections between devices coupled through the terminal block, such as central office equipment including PBXs and auxiliary equipment including dialers, may be altered without rewiring the terminal block.

In the embodiment illustrated in FIG. 4A, the terminal connecting block contains four rows of side-by-side electrically conductive elements 16a–16d, each of which contains a set of opposing fingers 20 and 22 and a tang 34. Accordingly, there are four longitudinal parallel rows of opposing contact fingers projecting from the top of the terminal connecting block and four parallel rows of tangs projecting from the bottom of the terminal connecting block. As shown in the schematics of FIGS. 12A–12B and FIG. 13, at least one pair of conductive elements from each of the first, second, third, and fourth pluralities may be coupled to unitary connector 40. For example, referring to FIG. 12A and FIGS. 11A–11C, elements 16a, 16b, 16c, in the preferred embodiment, are coupled to the CO Tip connection of a RJ-31X jack, with the CO_Tip connection being screw number 5, labelled Green, as in FIGS. 11A–11B, or with the CO Tip connection being slot 5, labelled Green, as in FIG. 11C.

Similarly, element 16d, coupled to PBX 170, is coupled to the PBX Tip connection of FIGS. 11A–11 C; elements 16e, 16f, and 16g are coupled to the CO Ring connection of FIGS. 11A–11C; and element 16h is coupled to the PBX Ring connection of FIGS. 11A–11C.

The terminal block as described above includes, for example, 50 slots, allowing 25 pairs of conductive elements to be coupled through 25 unitary connectors to 25 PBXs in the above-described configuration. As will be recognized by those skilled in the art, terminal blocks including a number of slots other than 50 slots may be provided. In addition, the terminal block of the present invention may also accommodate other unitary connectors such as other types of telephone jacks as well as unitary connectors as described in Reissued U.S. Pat. No. Re. 31,714. Various combinations of jacks and other unitary connectors as well as various auxiliary devices such as dialers and the like may be provided for interconnection through the terminal block of the present invention to PBXs and other devices such as central office equipment.

Figure 1:
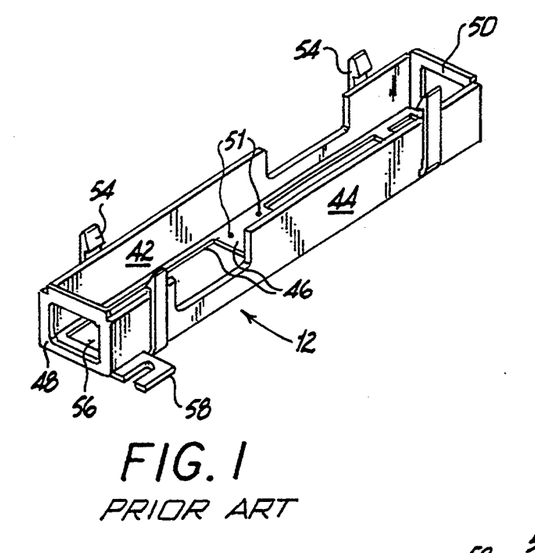
FIG. 1 is perspective view of the bracket which is used in combination with the terminal connecting block.

As shown in FIG. 1, the bracket 12 comprises two spaced apart elongate side portions 42 and 44 and an elongate rear portion 46 coextensive with the side portions 42 and 44. The side portions 42 and 44 are secured to opposite edges of the rear portion and are perpendicular thereto. The ends 48 and 50 of the bracket 12 are secured to the ends of the sides 42 and 44 and the rear 46. Each of the ends 48 and 50 contain apertures therein. The rear of the bracket 46 also contains two elongate apertures and up to eight holes 51 to allow the unitary connectors to be mounted thereon. As will be recognized by those skilled in the art, the number of unitary connectors that can be mounted on a bracket for pre-wiring will depend on the size of the bracket and the number of back or side openings or recesses to receive the connectors.

The bottom retaining plate 36 of the block 10 substantially covers the open front portion of the bracket 12 as shown in FIGS. 3 and 4A–4B. The tangs 34 and the electrically conductive wires 38 extend down into the space defined by the two elongate side portions 42 and 44 of the bracket 12. Each of the sides 42 and 44 contain a U-shaped recess in the top thereof in which is situated the unitary connectors 40. The unitary connectors are attached to the sides of the bracket by means of screws 52.

As seen in FIGS. 1, 2A–2B and 4A–4B, there are four clamps 54 affixed to the bracket 12. Two clamps are secured to each side 42 and 44. Each clamp 54 comprises a base portion 54a which is integral with the bottom portion of the sides of the bracket, a leg portion 54b which is spaced apart from the side of the bracket, and a cap 54c which extends over the space between the side of the bracket and the leg 54b. The cap 54c is positioned above the top of the side of the clamp and mates with a projection 55 located on the bottom cover 36 of block 10, thereby holding the block 10 in contact with the bracket 12. The clamps 54 are resilient and, by pulling the caps 54c in a direction away from the block, they will disengage from contact with the projections 55 thereby releasing the block 10.

The pre-wired bracket and block assembly may be attached to a suitable support means by placing either a screw or bolt through holes 56 located in each end of the rear of the bracket 46. One such hole 56 is shown in FIG. 1. Alternatively, the assembly may be secured to a support by means of mounting ears 58. One mounting ear 58 is located on the bottom of the side 44 and is integral therewith and another mounting ear 58 of the same shape is located on the bottom cover 36 of the block 10. Both of these two mounting ears are aligned with each other thus forming a pair of spaced apart mounting ears through which may be placed a bolt. Another set of mounting ears is situated on the other side 42 at the opposite end of the assembly.

Figure 7:
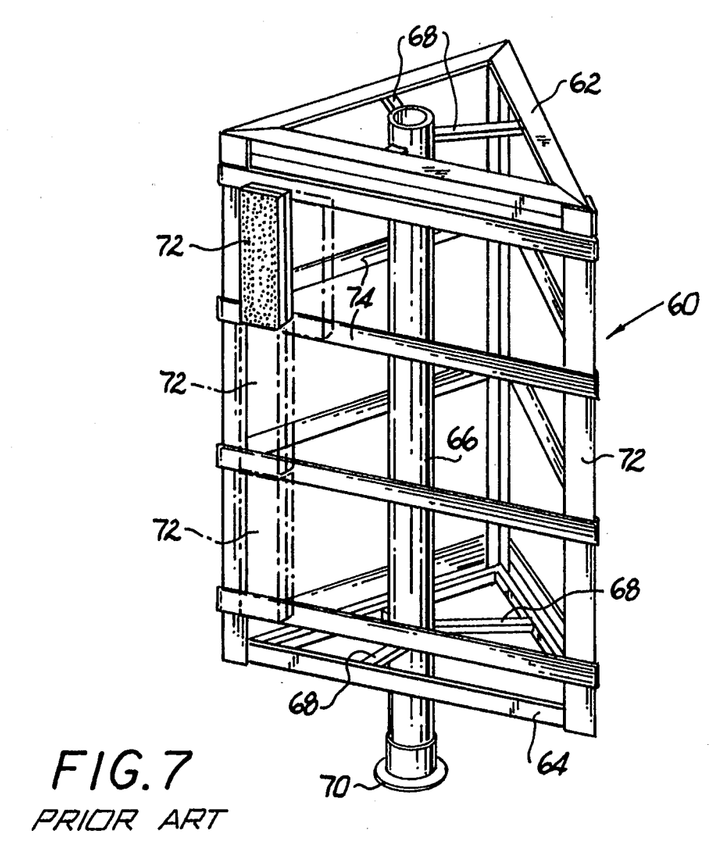
FIG. 7 is a perspective view of the combination electrical connecting block and bracket mounted on a three-sided telephonic equipment distribution panel.

FIG. 7 shows a tri-frame pedestal designated generally as 60 which may be used to support a plurality of the terminal block and bracket assemblies of this invention. The pedestal 60 comprises triangular frame members 62 and 64 which are secured to an upright, central post 66 by means of radial arms 68. The bottom of the post 66 is secured to a base member of flange 70. The flange 70 permits the frame 60 to be bolted to the floor. Each of the sides of support member 62 lies in the same substantially vertical plane as one of the sides of support members 64. Vertical angle irons 72 extend between each of the three corners on frames 62 and 64. Spaced apart horizontal support means 74 are coupled to the vertical angle irons 72. The block and bracket assembly of this invention is secured to the frame by fastening one end to one horizontal support means and the other end to the horizontal support means immediately above or beneath it. In the embodiment shown, three block and bracket assemblies are mounted end-to-end to form a row. A plurality of such rows may be mounted on each side of the frame. The openings at each end 48 and 50 of the brackets will accept up to six twenty-five pair cables (such cables being shown in phantom lines in FIGS. 4A–4B). This provides concealment and protection for the cables. All the wires in a twenty-five pair cable may be terminated as previously described in one set of fifty electrically conductive elements 16.

The terminal block and bracket assembly of this invention may be pre-wired for connection with a ten-key telephone set or they may be mounted on racks in central office installations and in a PABX or PBX system.

Figure 8:
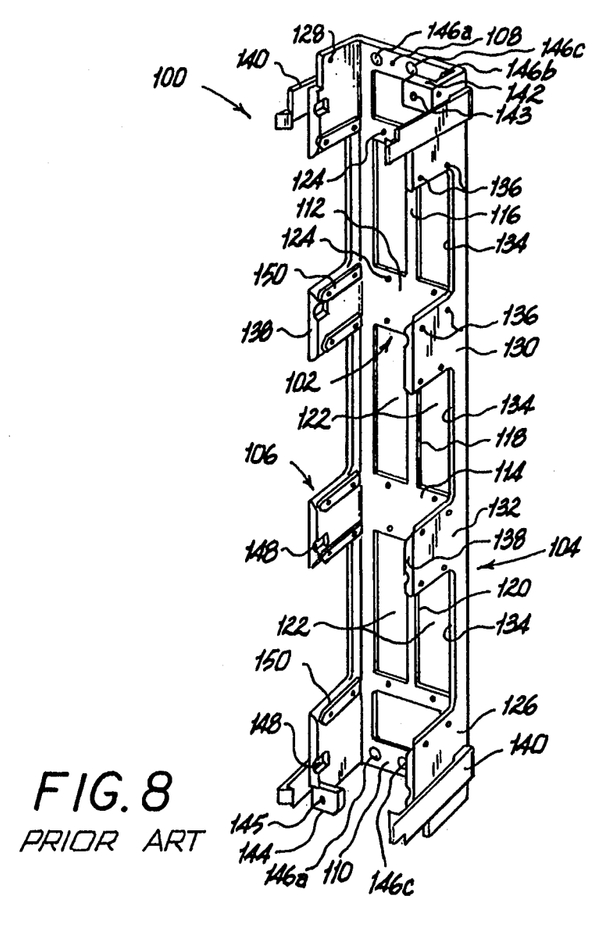
FIG. 8 is a perspective view of another embodiment of a bracket.
Figure 9:
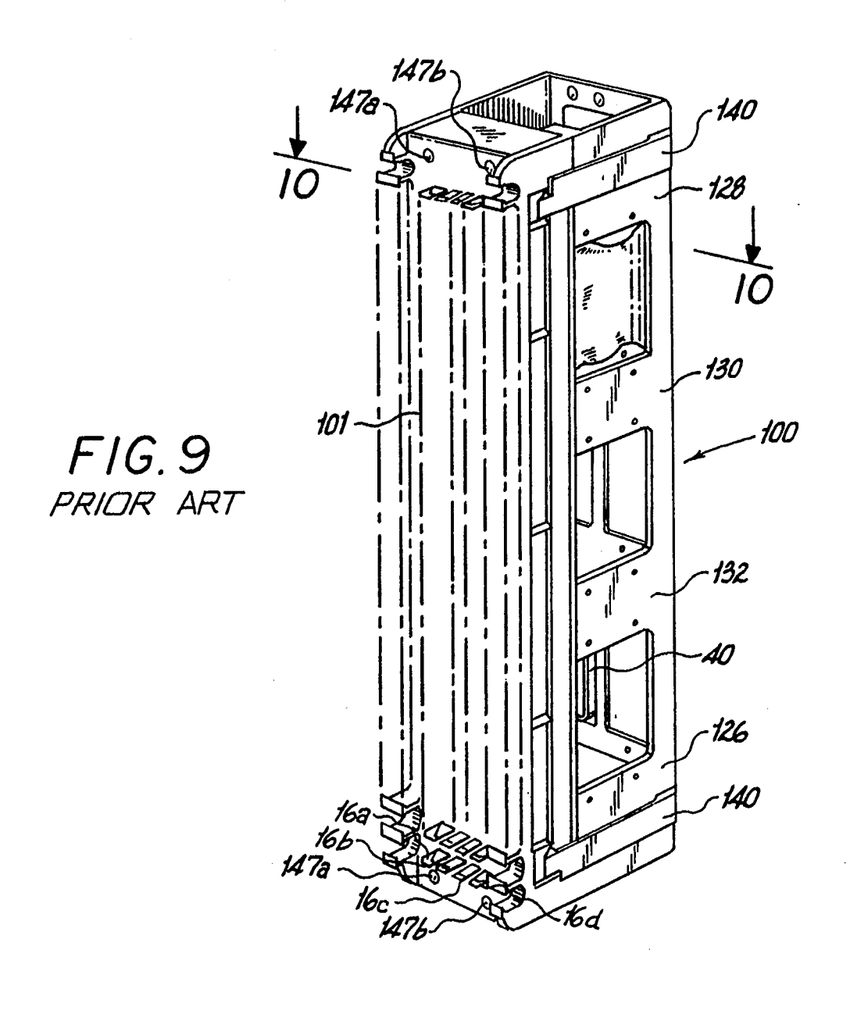
FIG. 9 is a partial view, in perspective of an assembly of a connecting block and the bracket of FIG. 8.

Referring now to FIGS. 8 and 9, another embodiment of a bracket in accordance with the present invention is shown. The bracket of FIGS. 8 and 9 is especially configured and suitable for mounting blocks which are known in the art as "B" blocks, and the bracket of FIGS. 8 and 9 will accept any presently known B block. The bracket 100 of FIG. 8 is formed of a rear portion, indicated generally at 102 and side portions indicated generally at 104 and 106. Rear portion 102 has end panels 108 and 110, intermediate divider panels 112 and 114 extending perpendicularly to the sides, and dividers 116, 118 and 120 extending perpendicular to end panels 108 and 110 and dividers 112 and 114. The dividers and end panels cooperate to define a plurality of openings 122 in the rear of the bracket, the openings being generally rectangular in shape to receive unitary connectors. A pair of mounting holes 124 is located at the opposite ends of each of the openings 122 for fastening the unitary connectors to the rear of the bracket by screw fasteners. Each side of the bracket has end panels 126 and 128 at opposite ends of the side, and each side also has intermediate dividers 130 and 132 so as to form three openings or recesses 134 along each side of the bracket. Although open at the front end of the bracket, the recesses 134 are generally rectangular in shape to receive unitary connectors, and mounting holes 136 are located at opposite ends of each recess to receive screw fasteners for mounting the unitary connectors in the recesses. As will be noted, there are two sets of mounting holes at the end of each recess so that the connectors can be staggered from one recess to the next above or below recess to accommodate the cable from the connector. In this manner, the cables can all lay flat along the side of the bracket so that multiple bracket and block assemblies can be mounted close together side by side. Rear mounted connectors can also be staggered to clear cables from one row to the next; or T type connectors can be mounted on the rear to clear cable interference. Accordingly, the bracket shown in FIG. 8 is capable of carrying back mounted unitary connectors and/or side mounted unitary connectors or any combination thereof.

Referring to FIG. 9 in conjunction with FIG. 8, a connecting block 101 is mounted to bracket 100 by butting the block against the forward mounting surface 138 of each divider 130 and 132. Four resilient holding clamps 140 extend from the rear of the bracket and overlap the front of the bracket adjacent each end of the bracket. Clamps 140 are substantially identical to clamps 54 previously described except that they engage grooves on the side body of block 1, and clamps 140 serve to removably retain the connecting block to the bracket. Bearing in mind that a B block is of comparatively large size and comparatively heavy, end mounting tabs 142 and 144 are located at the front edge of diametrically opposed end panels 126 and 128. Each of the end tabs 142 and 144 has an opening 143 and 145 to receive a screw fastener which will pass through an appropriate opening in the connector block to fasten the connector block to the bracket. The tabs 142 and 144 serve to positively lock the connector block to the mounting bracket to prevent inadvertent disengagement of the block from the bracket. Although the block can no longer be disengaged from the bracket merely by flexing clamps 140 when the block is fastening at tabs 142 and 144, no substantial disadvantage is experienced in the principal configuration of the present invention wherein the block and bracket are pre-wired, since there is no need to repetitively dismount the block from the bracket for wiring purposes as was previously required.

As shown in FIG. 8, a plurality of mounting holes 146a, 146b and 146c are provided at each end to mount the bracket for use. If the bracket is used in a non-prewired configuration, the bracket may be mounted on a panel or wall by fasteners in central mounting holes 146c. However, if the bracket is in a pre-wired assembly, holes 146b are not accessible for mounting. In that event, a pair of holes 147a and 147b in block 12 at each end are aligned with holes 146a and 146b when the block is mounted on the bracket, and fastening elements pass through the aligned holes 147a and 146a on one side and 147b and 146b on the other side of the prewired block and bracket assembly to mount the assembly. It will be noted that the opening 143 and 145 in tabs 142 and 144 are respectively aligned with a set of holes 147c and 146c at the top of the assembly and a set of holes 147a and 146a at the bottom, so that the fastening elements used to mount the pre-wired assembly will also pass through holes 143 and 145 in the mounting tabs 142 and 144 to lock the block to the bracket.

Figure 10:
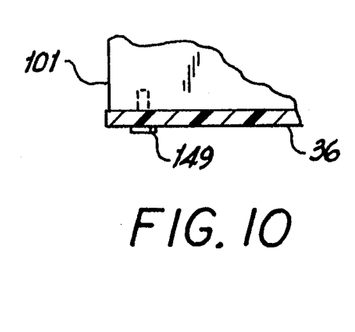
FIG. 10 is partial view showing a detail of the block.

The rear or back retainer plate of a connector block (e.g. plate 36 of FIGS. 4A-4B) is often fastened to the body of the connecting block 101 by means of screws fasteners of the general type shown at 149 in FIG. 10. The heads of these screw fasteners project beyond the rear plane of the retainer plate, so that the screw heads will extend behind the rear of the mounting bracket when the block is mounted on the bracket. In order to accommodate these screw heads, a semi-cylindrical recess 148 is located in each of the end panels 126 and 128 and the dividers 130 and 132, with the recess 148 being on the innermost side of each element and intercepting the mounting surface 138. The recesses 148 are positioned so that the projecting fastener heads 147 on the back of the connector block mate with the recesses 148 and fasteners 147 act as dowels to prevent end panels 126 and 128 and dividers 130 and 132 from flexing inwardly when pressure is applied to them to mount connectors.

As discussed with the previous embodiment, when the connector block is mounted on a bracket a passageway of generally rectangular cross-sectional shape is defined between the connecting block and the bracket. Cables, such as shown in phantom in FIGS. 4A-4B, can be passed through that rectangular channel in addition to the individual wires from the unitary connectors to the tangs 34 of the conductive elements 16a-16d. The inner surface of each of the side end panels and dividers is provided with a thickened portion or strip 150 at the location of each of the mounting holes 136 so that the screw fasteners which mount the unitary connectors to the sides of the bracket do not extend into the interior of the bracket where they might come in contact with and break or wear the insulation to short circuit any of the wires in the interior channel of the bracket.

As will be apparent to those skilled in the art, particularly neat and orderly installation results from the use of the present invention. In addition to the pre-wiring configuration where the conductors from the unitary connectors to the tangs 34 are all located in the interior channel of the assembly, the supply or main wires from central office, such as shown in phantom in FIGS. 4A-4B, can also pass through the interior channel of the assembly rather than being on the panel board in a rather jumbled array as is often the case. Furthermore, field installation of equipment is greatly simplified, since installation is achieved merely by plugging into the unitary connectors or by punching onto the elements 16a-16d.

Of course, while the description has referred to the unitary connectors being connected to individual telephone stations and the conducting elements 16 connected to central station, it will also be understood that those connections can be reversed.

The pre-wired assembly of the present invention can also be used to cross connect cables for increased capacity; and auxiliary equipment such as telex installations can be directly and simply hooked up by connectors to the fingers of conductive elements 16a-16d.

A particularly useful application for the pre-wired assembly of the present invention is as an interface block for customer added equipment. One such example is shown in FIG. 12A where one unitary connector is connected to two rows of elements 16a-16h and to central, such as PBX 170. A complete interface block is thus realized, allowing auxiliary device 161 such as a dialer (FIG. 13) to be readily connected through the unitary connector 40 to the PBX 170, as well as to conductive elements 16a-16h to be ready for use. This configuration is illustrated in FIG. 4A where connector 40 goes to auxiliary equipment and to conductive elements 16c, 16d; and conductive elements 16b and 16c are bridged by bridge connectors 162.

While preferred embodiments have been shown and described, various modifications and substitutions may be made thereto without departing from the spirit and scope of the invention. Accordingly, it will be understood that the present invention has been described by way of illustration and not limitation.

I claim:

1. An apparatus for use in connecting telephone equipment including a private branch exchange (PBX) and a first auxiliary device including a dialer to telephone lines, the apparatus comprising:
   a plurality of conductive element sets for connecting to respective telephone lines, said conductive element sets having:
   a first plurality of conductive elements;
   a second plurality of conductive elements, each of said second plurality of conductive elements electrically coupled to a respective one of said first plurality of conductive elements;
   a third plurality of conductive elements, each of said third plurality of conductive elements electrically isolated from said first and second pluralities of conductive elements;
   a plurality of bridge connectors, each of said plurality of bridge connectors for coupling a respective one of said second plurality of conductive elements with a respective one of said third plurality of conductive elements;
   a fourth plurality of conductive elements, each of said fourth plurality of conductive elements electrically isolated from said first, second, and third pluralities of conductive elements, said fourth plurality of conductive elements for electrically coupling to said first auxiliary device; and
   a unitary connector for electrically coupling at least one of said third plurality of conductive elements and at least one of said fourth plurality of conductive elements to operatively connect said telephone lines to said dialer and said PBX.

2. The apparatus as set forth in claim 1, wherein each of said plurality of bridge connectors removably couples the respective one of said second plurality of conductive elements with the respective one of said third plurality of conductive elements.

3. The apparatus as set forth in claim 1 wherein said unitary connector is an RJ-31X connector.

4. The apparatus as set forth in claim 1 further comprising:

the private branch exchange (PBX), coupled to at least one pair of said fourth plurality of conductive elements; and said first auxiliary device being coupled to said PBX through said unitary connector.

5. An apparatus for use in connecting telephone equipment including a private branch exchange (PBX) and a first auxiliary device including a dialer to telephone lines, the apparatus comprising:

a plurality of conductive element sets for connecting to respective telephone lines, said conductive element sets having:

a first plurality of conductive elements;

a second plurality of conductive elements, each of said second plurality of conductive elements electrically coupled to a respective one of said first plurality of conductive elements;

a third plurality of conductive elements, each of said third plurality of conductive elements electrically isolated from said first and second pluralities of conductive elements;

a plurality of bridge connectors, each of said plurality of bridge connectors for coupling a respective one of said second plurality of conductive elements with a respective one of said third plurality of conductive elements;

a fourth plurality of conductive elements, each of said fourth plurality of conductive elements electrically isolated from said first, second, and third pluralities of conductive elements, said fourth plurality of conductive elements for electrically coupling to said first auxiliary device; and a unitary connector for electrically coupling at least one of said third plurality of conductive elements and at least one of said fourth plurality of conductive elements to operatively connect said telephone lines to said dialer and said PBX, the dialer being coupled to said unitary connector for dialing telephone calls through said telephone lines.

6. A pre-wired mounting bracket and terminal connecting block for connecting telephone lines to telephone equipment including a private branch exchange (PBX) and a first auxiliary device including a dialer, the bracket having two spaced-apart elongate side portions, an elongate rear portion coextensive with said side portions, each of said side portions being secured to opposite edges of said rear portion and being perpendicular thereto, the front portion of said bracket being open, the back of said terminal connecting block substantially covering the open front portion of said bracket, said bracket including electrically conductive wires being situated between the two elongate side portions of said bracket, a unitary electrical connector coupled to said wires for connection to an auxiliary device located in an opening in the rear of one of said elongate side portions of said bracket, the pre-wired mounting bracket and terminal connecting block comprising:

a first plurality of conductive elements;

a second plurality of conductive elements, each of said second plurality of conductive elements coupled to a respective one of said first plurality of conductive elements;

a third plurality of conductive elements, each of said third plurality of conductive elements electrically isolated from said first and second pluralities of conductive elements;

a plurality of bridge connectors, each of said plurality of bridge connectors for coupling a respective one of said second plurality of conductive elements with a respective one of said third plurality of conductive elements;

a fourth plurality of conductive elements, each of said fourth plurality of conductive elements electrically isolated from said first, second, and third pluralities of conductive elements; and said unitary connector for electrically coupling at least one of said third plurality of conductive elements and at least one of said fourth plurality of conductive elements through said wires to operatively connect said telephone lines to said dialer and said PBX.

7. The pre-wired mounting bracket and terminal connecting block as set forth in claim 6 further comprising:

the dialer of the first auxiliary device being coupled to said unitary connector for dialing telephone calls through said unitary connector and telephone lines.

8. The pre-wired mounting bracket and terminal block assembly as set forth in claim 6 wherein each of said plurality of bridge connectors removably couples the respective one of said second plurality of conductive elements with the respective one of said third plurality of conductive elements.

9. The pre-wired mounting bracket and terminal connecting block as set forth in claim 6 wherein said unitary connector is an RJ-31X connector.

10. The pre-wired mounting bracket and terminal connecting block assembly as set forth in claim 6 further comprising:

the private branch exchange (PBX) coupled to said fourth plurality of conductive elements; and said first auxiliary device is configured for connection to said PBX through said unitary connector.

11. In an improved pre-wired mounting bracket and terminal block assembly for use in connecting telephone equipment including an auxiliary device, the pre-wired mounting bracket and terminal block assembly including a terminal connecting block containing a set of electrically conductive elements, each element comprising a base portion and at least one pair of opposing contact fingers projecting in a first direction from said base portion and integral therewith, said elements being arranged such that the pair of opposing contact fingers are in a longitudinal row in said terminal connecting block, said opposing contact fingers projecting from the front of said terminal connecting block, each of said conductive elements further comprising a tang projecting in a second direction from said base portion beyond the back of said terminal connecting block; at least one unitary electrical connector, a plurality of said conductive elements being in electrical contact with said unitary electrical connector by means of electrically conductive wires, one end of each wire being attached to one of said tangs and the other end of each wire being attached to said unitary electrical connector; and a bracket, said bracket comprising two spaced apart elongate side portions, an elongate rear portion coextensive with said side portions, each of said side portions being secured to opposite edges of said rear portion and being perpendicular thereto, the front portion of said bracket being open, the back of said terminal connecting block substantially covering the open front portion of said bracket and said tangs and said electrically conductive wires being situated between the two elongate side portions of said bracket, said unitary electrical connector being located in an opening in the rear of one of said elongate side portions of said bracket; the improvement comprising:

the set of electrically conductive elements including first, second, third, and fourth pluralities of conductive elements;

each of said second plurality of conductive elements being coupled to a respective one of the first plurality of conductive elements;

each of the third plurality of conductive elements being electrically isolated from the first and second pluralities of conductive elements;

a plurality of bridge connectors, each of said plurality of bridge connectors for coupling a respective one of said second plurality of conductive elements with a respective one of said third plurality of conductive elements;

each of the fourth plurality of conductive elements being electrically isolated from the first, second, and third pluralities of conductive elements; and said unitary connector for electrically coupling at least one of said third plurality of conductive elements and at least one of said fourth plurality of conductive elements to said auxiliary device.

12. The improved pre-wired mounting bracket and terminal block assembly as set forth in claim 11, wherein each of said plurality of bridge connectors removably couples the respective one of said second plurality of conductive elements with the respective one of said third plurality of conductive elements.

13. The improved pre-wired mounting bracket and terminal block assembly as set forth in claim 12, the improvement further comprising:

said unitary connector being an RJ-31X connector for electrically coupling said auxiliary device to said third plurality of conducting elements and said fourth plurality of conductive elements.

14. The pre-wired mounting bracket and terminal block assembly as set forth in claim 11, the improvement further comprising:

a private branch exchange (PBX), coupled to said fourth plurality of conductive elements; and said auxiliary device is coupled to said PBX through said unitary connector.

15. A method for connecting telephone equipment including a private branch exchange (PBX) and a first auxiliary device including a dialer to telephone lines comprising the steps of:

coupling each of a first plurality of conductive elements to a respective one of a second plurality of conductive elements;

electrically isolating a third plurality of conductive elements from said first and second pluralities of conductive elements;

coupling each of said second plurality of conductive elements with a respective one of said third plurality of conductive elements using a respective one of a plurality of bridge connectors;

electrically isolating a fourth plurality of conductive elements from said first, second, and third pluralities of conductive elements;

coupling said first auxiliary device to a first one of said third plurality of conductive elements and a first one of said fourth plurality of conductive elements through a unitary connector; and electrically coupling a second one of said third plurality of conductive elements and a second one of said fourth plurality of conductive elements to said PBX.

16. The method as set forth in claim 15 further comprising the step of:

mounting said first, second, third, and fourth pluralities of conductive elements on a mounting bracket.

17. The method as set forth in claim 16, wherein the step of coupling said second plurality to said third plurality further includes removably coupling each of said second plurality of conductive elements with a respective one of said third plurality of conductive elements using a respective one of a plurality of bridge connectors.

18. The method as set forth in claim 17 further comprising the step of:

electrically coupling a respective pair of said third plurality of conductive elements and a respective pair of said fourth plurality of conductive elements to said unitary connector.

19. The method as set forth in claim 17 further comprising the steps of:

coupling the private branch exchange (PBX) to at least one pair of said fourth plurality of conductive elements; and coupling said first auxiliary device to said PBX through said unitary connector.

20. The method as set forth in claim 19 further comprising the step of:

removing at least one of said plurality of bridge connectors to change the coupling of at least one of said second plurality of conductive elements with a respective at least one of said third plurality of conductive elements.

* * * * *